United States Patent
Assion et al.

(10) Patent No.: US 12,153,718 B2
(45) Date of Patent: Nov. 26, 2024

(54) DEFENSE GENERATOR, METHOD FOR PREVENTING AN ATTACK ON AN AI UNIT, AND COMPUTER-READABLE STORAGE MEDIUM

(71) Applicant: NEUROCAT GMBH, Berlin (DE)

(72) Inventors: Felix Assion, Berlin (DE); Florens Fabian Gressner, Berlin (DE); Frank Kretschmer, Cottbus (DE); Stephan Hinze, Berlin (DE)

(73) Assignee: Neurocat GmbH, Berlin (DE)

(*) Notice: Subject to any disclaimer, the term of this patent is extended or adjusted under 35 U.S.C. 154(b) by 0 days.

(21) Appl. No.: 17/768,440

(22) PCT Filed: Oct. 13, 2020

(86) PCT No.: PCT/EP2020/078725
§ 371 (c)(1),
(2) Date: Apr. 12, 2022

(87) PCT Pub. No.: WO2021/074121
PCT Pub. Date: Apr. 22, 2021

(65) Prior Publication Data
US 2024/0119142 A1   Apr. 11, 2024

(30) Foreign Application Priority Data
Oct. 14, 2019 (DE) .......................... 102019127622.5

(51) Int. Cl.
*G06F 21/60* (2013.01)
*G06F 21/55* (2013.01)
(Continued)

(52) U.S. Cl.
CPC ............ *G06F 21/64* (2013.01); *G06F 21/554* (2013.01); *G06N 5/04* (2013.01); *G06V 10/82* (2022.01); *G06F 2221/033* (2013.01)

(58) Field of Classification Search
CPC .. G06F 21/64; G06F 21/554; G06F 2221/033; G06F 18/24133; G06N 5/04; G06N 3/045; G06N 3/08; G06V 10/82
See application file for complete search history.

(56) References Cited

U.S. PATENT DOCUMENTS

| | | | |
|---|---|---|---|
| 11,036,857 B2* | 6/2021 | Tran ........................ | G06N 3/045 |
| 2019/0238568 A1* | 8/2019 | Goswami .............. | G06F 21/566 |
| 2021/0248241 A1* | 8/2021 | Balkanski .............. | G06V 30/20 |

FOREIGN PATENT DOCUMENTS

WO   WO-2021/074121 A1   4/2021

OTHER PUBLICATIONS

Akoury, N. et al. (2017). "Spatial PixelCNN: Generating Images from Patches." (arXiv:1712.00714v1 [cs.CV] Dec. 3, 2017.) 12 pages.

(Continued)

*Primary Examiner* — Izunna Okeke
(74) *Attorney, Agent, or Firm* — Mintz, Levin, Cohn, Ferris, Glovsky and Popeo, P.C.

(57) ABSTRACT

Adversarial attacks pose a threat to the functioning of AI systems. A defense generator for dynamically generating at least one AI defense module is provided. A core feature of the invention is that a distribution function is determined for model data. The invention is based on the assumption that the model data belong to a model manifold, or have a similar statistical behavior. Thus, it is possible to determine for an input data set whether the data of the input data set can be associated with an adversarial attack. This is the case, for example, if statistical anomalies are found in the input data set.

12 Claims, 4 Drawing Sheets

(51) Int. Cl.
  *G06F 21/64* (2013.01)
  *G06N 5/04* (2023.01)
  *G06V 10/82* (2022.01)

(56) References Cited

OTHER PUBLICATIONS

Ma, X. et al. (2018). "Characterizing Adversarial Subspaces Using Local Intrinsic Dimensionality." (arXiv:1801.02613v3 [cs.LG] Mar. 14, 2018.) 15 pages.

Feinman, R. et al. (2017). "Detecting Adversarial Samples from Artifacts." 9 pages. arxiv.org, Cornell University Library, 201 Olin Library Cornell University Ithaca, NY 14853, Mar. 1, 2017 (Mar. 1, 2017), XP080753554.

Grosse, K. et al. (2017). "On the (Statistical) Detection of Adversarial Examples." 15 pages. arxiv.org, Cornell University Library, 201 Olin Library Cornell University Ithaca, NY 14853, Feb. 21, 2017 (Feb. 21, 2017), XP080747927.

International Search Report issued in International Application No. PCT/EP2020/078725, mailed Jan. 13, 2021 (Jan. 13, 2021). 7 pages. [German language with English language translation attached].

Liang, B. et al. (2018). "Detecting Adversarial Image Examples in Deep Neural Networks with Adaptive Noise Reduction." In: IEEE Transactions on Dependable and Secure Computing, S. pp. 1-14. doi: 10.1109/TDSC.2018.2874243 (URL: https://ieeexplore.ieee.org/iel7/8858/4358699/08482346.pdf).

Lu, J. et al. (2017). "SafetyNet: Detecting and Rejecting Adversarial Examples Robustly." In: Proceedings of the IEEE International Conference on Computer Vision. S. pp. 446-454. doi: 10.1109/ICCV.2017.56 (URL: https://scholar.google.de/scholar?output=instlink&g=info:HLXze04JY AJ:scholar.google.comf&hl=de&as_sdt=0.5&scillfp=11109289620522659293&oi=lle).

Mao, C. et al. (2019). "Metric Learning for Adversarial Robustness." 18 Pages. arxiv.org, Cornell University Library, 201 Olin Library Cornell University Ithaca, NY 14853, Sep. 3, 2019 (Sep. 3, 2019), XP081472238.

Office Action issued in German Patent Application No. DE 10 2019 127 622.5, dated Apr. 30, 2020 (Apr. 30, 2020). 14 pages. [German language].

Qiu, S. et al. (2019). "Review of Artificial Intelligence Adversarial Attack and Defense Technologies." In: Applied Sciences, 9, 909, (Date of Publication: Apr. 3, 2019). S. pp. 1-29. doi: 10.3390/app9050909 (URL: https://www.mdpi.com/2076-3417/9/5/909/pdf).

Song, Y. et al. (2018). "PixelDefend: Leveraging Generative Models to Understand and Defend Against Adversarial Examples." 20 pages. arxiv.org, Cornell University Library, 201 Olin Library Cornell University Ithaca, NY 14853, Oct. 30, 2017 (Oct. 30, 2017), XP081316172.

Written Opinion issued in International Application No. PCT/EP2020/078725, mailed Jan. 13, 2021 (Jan. 13, 2021). 9 pages. [German Language with English translation of Box V].

* cited by examiner

DEFENSE GENERATOR, METHOD FOR PREVENTING AN ATTACK ON AN AI UNIT, AND COMPUTER-READABLE STORAGE MEDIUM

CROSS-REFERENCE TO RELATED APPLICATIONS

The present application is a National Stage of International Application No. PCT/EP2020/078725, filed on Oct. 13, 2020, and titled "Attack-deterrent generator method for preventing an attack on an AI unit, and computer-readable storage medium," which claims priority to German Patent Application No. 102019127622.5, filed Oct. 14, 2019, and titled, "Attack-deterrent generator method for preventing an attack on an AI unit, and computer-readable storage medium," the entirety of each of which is incorporated by reference in its entirety.

FIELD

The invention relates to a defense generator for dynamically generating at least one AI defense module, a defense system against an adversarial attack on an AI unit, a method for dynamically generating AI defense modules, a method for preventing an attack on an AI unit, and a computer-readable storage medium.

BACKGROUND

Most machine learning methods known in the prior art are susceptible to adversarial interferences. It follows that robustness to adversarial interferences is a major challenge in the development of machine learning methods.

An adversarial interference occurs when data to be classified has been changed in such a way that the human observer does not notice the change, but a correct classification by means of an AI unit is no longer possible. Thus, multiple misclassification can occur.

In the context of image classification, for example in the segmentation of image data, adversarial interference can be caused by superimposing noise on the input images. This noise can be inserted into the input image in such a way that it is not recognizable to the human observer.

However, adversarial interference does not occur in the natural environment, i.e., in commonly provided sensor data. One way in which adversarial interference occurs is when an AI unit is attacked. This means that an attacker modifies the data given to the AI unit for classification in such a way that it cannot be classified correctly. This results in major security risks, particularly with regard to safety-critical applications such as highly automated driving. For example, if misclassification occurs in highly automated driving, a vehicle may fail to recognize a stop sign or recognize it incorrectly. It is also possible that a vehicle will fail to stop at a red light, posing a great danger to the rest of the road traffic.

One goal is therefore to reduce the risk of adversarial attacks. There are isolated approaches to this, but they are tailored reactively to a specific attack. This means that, until now, a countermeasure can only be developed at the time the attack occurs.

However, it is known that there is an unlimited number of possible attacks on AI entities using adversarial interference.

SUMMARY

It is therefore an object of the invention to provide a way to protect AI units from adversarial attacks. In particular, it is an object of the invention to identify an adversarial attack. It is further, in particular, an object of the invention to design an AI unit to be robust against adversarial attacks. It is further in particular an object of the invention to provide a possibility to generate an unlimited number of defense modules for AI units.

This object is solved by a defense generator for dynamically generating at least one AI defense module, a defense system against an adversarial attack on an AI unit, a method for dynamically generating AI defense modules, a method for preventing an attack on an AI unit, and a computer-readable storage medium.

In particular, the problem is solved by a defense generator for dynamically generating at least one AI defense module, comprising the following:

a tiling unit which is adapted to determine at least one tile for model data, wherein the model data is associated with an AI unit and the at least one tile indicates at least one subset of the model data;

an aggregation unit which is adapted to determine aggregated data, wherein the aggregated data assign at least one, in particular mathematical, key figure to the at least one tile;

a distribution unit which is adapted to determine a distribution function for the aggregated data;

an inference unit which is adapted to determine at least one inference configuration using the distribution function;

a data transformation unit which is adapted to generate at least one AI defense module for the AI unit using the at least one inference configuration, wherein the at least one AI defense module is adapted to perform the following steps for an input data set of the AI unit:

to determine whether an attack on the AI unit can be associated with the input data set; and/or to determine, using a data transformation, a second input data set with which no attack on the AI unit can be associated.

A core of the invention is that a distribution function is determined for model data. The invention is based on the assumption that the model data belong to a model manifold. In other words, that the model data have a similar statistical behavior. Thus, for an input data set comprising, for example, images from an RGB camera, it is possible to determine whether the data of the input data set belong to an adversarial attack. This is the case, for example, if statistical anomalies can be detected in the input data set.

In addition, the invention also comprises the possibility of determining a second input data set for the input data set, which has no statistical anomalies and thus cannot be assigned to an attack on the AI unit. Thus, the noise that was inserted into the original data by the adversarial attack can be filtered out again.

The invention is not limited to any particular type of AI unit. For example, it is possible for the AI unit to be an artificial neural network, a Bayes classifier, a Markov logic unit, or any other type of classifier.

Overall, the invention provides a means to generate countermeasures for any adversarial attacks. These countermeasures are implemented by the defense module for the AI unit. The defense module for the AI unit may thus be executable program code. This program code may be in compiled form or in non-compiled form. It is also conceivable that the defense module for the AI unit is implemented as an add-on for the AI unit. Thus, prior to a classification or regression task, the defense module for the AI unit can be used by the AI unit to determine whether there is an attack on the AI unit and render it harmless by a data transformation.

For example, the model data may be formed as a tensor. The at least one tile may form a subset of the tensor. For example, the at least one tile may represent a one-dimensional tensor comprising a subset of a dimension of the tensor of the model data. The model data may be formed in one or more dimensions.

In one embodiment, the model data may be formed as an image having at least one color channel, in particular three color channels, preferably red-green-blue.

If the model data is formed as an image, then the at least one tile can indicate an image section of a respective color channel.

With the described embodiment, local dependencies are exploited. Thus, model data can be divided into a multitude of tiles, which together form a tile set.

For example, there are dependencies between the values of closely spaced pixels in an image. If the distance between two pixels is very large, there is almost no dependency. Similarly, there is a large dependency between letters of a word. Between the letters of different words or even different paragraphs, on the other hand, there is hardly any dependency. Thus, it is possible to process different tiles of the input data separately. This enables parallelization and thus more efficient execution.

In one embodiment, the tiling unit may be adapted to receive a tile indication, wherein the tile indication may in particular be user-definable, wherein the tile indication may preferably indicate a kernel size, a stride and/or an offset, and wherein the tiling unit may be adapted to determine the at least one tile by using the tile indication.

The kernel size may indicate the size of the at least one tile, in particular, the kernel size may include an indication for the x-axis, an indication for the y-axis, and/or an indication for the z-axis. The stride or step size may specify the step size at which a new tile is generated when scanning the input data set. The offset may be defined such that an offset by the step size does not create a tile that is smaller than the other tiles. This could be the case if, for example, an input image of size 10×10 pixels is scanned with a kernel of size 3×3 pixels for which a step size of three pixels is defined. In this case, an offset of two pixels is necessary.

In one embodiment, the model data may specify image data, audio data, sensor data, text data, and/or at least one artificial neural network feature detector.

The model data can comprise a wide variety of data. In addition to the image data already mentioned, speech data, sensor data or text data are also possible. However, it is also possible to use parts of an AI unit as model data instead of the data to be classified.

Thus, adversarial interferences have been shown to lead to unusual patterns in activation functions of an artificial neural network.

Thus, it is provided that in one embodiment feature detectors of an artificial neural network, in particular a convolutional neural network, may form the model data.

In one embodiment, the aggregation unit may be configured to receive an aggregation indication, in particular a user-definable aggregation indication, wherein the aggregation indication and/or the at least one key figure may respectively indicate a singular value decomposition, a convolution, a mean value, a median and/or a variance for the at least one tile, and wherein the aggregation unit may be configured to determine the aggregated data by taking into account the aggregation indication.

With the described embodiment, it is possible that the aggregation unit is adapted to convolve the data of the input data set, e.g. with a filter, in order to determine the aggregated data. This may be implemented by a discrete Fourier transform followed by a multiplication and subsequent integration, such that the convolution corresponds to a multiplication followed by an integration in the frequency spectrum.

In one embodiment, the aggregation unit may be configured to perform a singular value decomposition for the at least one tile. In such cases where a tile has more than one dimension, the tile may be represented as a block matrix, where each block of the block matrix corresponds to one dimension of the at least one tile.

Adversarial interferences have been shown to produce unusual patterns, particularly in the lower singular values of a matrix. Thus, an adversarial interference in the model data can be detected by a singular value decomposition.

In one embodiment, it is further possible to determine the mean value, the median, and/or a variance for the at least one tile. In this case, the aggregated data can be formed as a vector of statistical values.

In one embodiment, the aggregation unit may be configured to receive a/the tile indication from the tiling unit, wherein the aggregation unit may be configured to subtract the tile indication from the at least one tile to determine the aggregated data.

The at least one tile may specify a plurality of values. For example, a tile may specify a plurality of brightness values. It is equally possible for a tile to specify a plurality of letters, such that a tile can specify a passage of text.

It is equally contemplated in the embodiment described above to subtract a median, a variance, or a mean value from the at least one tile. If more than one tile is provided, then subtracting said values from one tile may mean that if the at least one tile is formed as a tensor, the mean value and/or median over all tiles/tensors is subtracted from each data element of the tensor. The median, the variance and/or the mean value can be determined over all data elements of the at least one tile or of the tensor or over all tiles/tensors.

Subtracting statistical values has the advantage that it makes tiles from different regions comparable.

In one embodiment, the defense generator may be adapted to receive a target definition, in particular a user-definable target definition, and the inference unit may be adapted to determine the inference configuration by taking into account the target definition.

In this regard, the data transformation unit may be configured to select, by taking into account the inference configuration, whether to perform a determination of whether an attack on the AI unit can be associated with an input data set or to perform a determination using the data transformation of a second input data set with which an attack on the AI unit cannot be associated.

With the target definition it is thus possible to control the behavior of the AI defense modules. Thus, an easier way is provided for users to define the behavior of the AI defense modules.

In one embodiment, the distribution unit may be configured to receive a distribution indication, in particular a user-definable distribution indication, wherein the distribution unit may further be configured to determine the distribution function by taking into account the distribution indication, wherein the distribution indication may indicate an explicit or implicit distribution function.

It is thus possible that a calculation method for a probability distribution is indicated by the distribution indication, so that the data distribution indicates a probability distribution. In this case, an implicit or an explicit distribution function can be indicated by the distribution indication.

With an explicit distribution function, a transition matrix can be determined. The transition matrix can e.g. indicate a Markov chain. It is also conceivable that a Gibbs distribution is determined by an explicit distribution function.

The matrix elements of a transition matrix may each correspond to a datum of the aggregated data. A transition matrix may specify, for each matrix element, a probability or probability distribution that the corresponding matrix element takes on a particular value. Thus it is conceivable that if the input data set specifies image data, each pixel is assigned a probability that an adjacent pixel has a particular brightness value.

An implicit distribution function can be implemented, for example, by quilts or a natural aggregation. In the method using quilts, a distance from input data to model data is determined. For example, the L2 metric or another metric can be used to determine the distance. If the distance is greater than a predetermined threshold, then an attack on the AI unit can be inferred. In addition, it is possible to replace a tile of the input data, based on the metric used, with the closest tile of the model data to determine the second input data set. In this case, the model data no longer has adversarial interferences, so an unperturbed tile in the input data can be replaced.

In one embodiment, the inference unit may be configured to receive at least one threshold value, in particular a user-definable threshold value, and the determination of the inference configuration may be performed by taking into account the at least one threshold value, wherein the at least one threshold value may indicate that a data transformation is performed by the AI defense module when the at least one threshold value is exceeded.

In one embodiment, the threshold value may be compared to a distance, for example, as described above. This means that the AI defense module may be configured to compare the threshold value to a distance between input data or a tile that may indicate a subset of the input data and the at least one tile.

In one embodiment, the AI defense module may be further configured to perform the data transformation based on the comparison, e.g., when the distance is greater than the threshold.

In one embodiment, the AI defense unit may be configured to determine, based on the comparison, whether an attack on the AI unit can be associated with the input data set, e.g., if the distance is greater than the threshold.

In addition to the distance, it is also conceivable that the AI defense unit is adapted to determine a so-called overall probability value for the model data. The comparison can then be carried out with the overall probability value.

In one embodiment, the AI defense unit for generating the second input data may be configured to perform smoothing of the input data or the at least one tile based on the comparison. A smoothing of the input data or the at least one tile may result in the adversarial interference no longer having an influence on the AI unit.

In one embodiment, the inference unit may be configured to receive a reconstruction indication, wherein the inference unit may be configured to determine the inference configuration in consideration of the reconstruction indication, wherein the reconstruction indication may indicate whether a data transformation involves the entire model data, a random subset of the model data, and/or an importance-based selection of the model data.

It is thus equally possible with the described embodiment to reconstruct only part of the input data. This allows the device to work more efficiently overall. Errors can also be avoided if only part of the input data has to be taken into account.

Thus, in one embodiment, the AI defense unit may be configured to decompose input data, as described above, into at least one tile. Only certain tiles can be taken into account during the reconstruction. Thus, in the case of image data, individual image areas can be checked separately so that, in particular mathematical, key figures are calculated by the AI defense unit for these image areas in each case. This embodiment takes into account the fact that, for example, a sky with homogeneous blue has different properties in the mathematical-visual average than, for example, an image area showing a road. The image areas, or the tiles corresponding to these image areas, can be statically determined. It is further conceivable that the image areas or tiles are determined dynamically by the AI defense unit, taking image properties into account.

In one embodiment, the second input data set has no adversarial interference. This means that an AI unit with the second input data functions as intended.

In one embodiment, a/the data transformation may be formed as a sampling method.

Using a sampling method, it is possible to determine the second input data set so that no more adversarial interference is present in the second input data set.

The object is further solved in particular by a defense system against an adversarial attack on an AI unit, the defense system comprising:
  an input unit adapted to receive input data and/or an input model as model data;
  a defense generator, in particular as described above, adapted to receive the model data and to generate at least one AI defense module;
  an AI unit adapted to use the at least one AI defense module prior to performing a regression and/or classification in order to
    determine whether an attack on the AI unit can be associated with an input data set of the AI unit; and/or
    to determine, by using a data transformation, a second input data set with which no attack on the AI unit can be associated and to use the second input data set in the regression and/or classification.

It is therefore also envisaged that at least one AI defense module generated by the defense generator is used to defend against an attack on an AI unit in a defense system. Thus, an attack on an AI unit can be prevented in an efficient and secure manner.

The object is also solved in particular by a method for dynamic generation of AI defense modules, the method comprising the following steps of:
  determining at least one tile for model data, wherein the model data is associated with an AI unit and the at least one tile indicates at least one subset of the model data;
  determining aggregated data, wherein the aggregated data of the at least one tile are assigned, in particular mathematical, key figures;
  determining a distribution function for the aggregated data;
  determining at least one inference configuration using the distribution function;
  generating at least one AI defense module for the AI unit using the at least one inference configuration, wherein the at least one AI defense module is particularly adapted to be used for an input data set of the AI unit in order to:
determine whether an attack on the AI unit can be associated with the input data set; and/or
to determine, using a data transformation, a second input data set with which no attack on the AI unit can be associated.

In one embodiment, the method may comprise receiving a tile indication, in particular a user-defined tile indication, wherein the tile indication may in particular be user-definable, wherein the tile indication may preferably specify a kernel size, a stride, and/or an offset.

In this regard, determining the at least one tile may be determined using the tile indication. The kernel size may be selected by taking into account the operation of an AI unit. For example, the kernel size may be selected such that the operation of the AI unit is not affected by replacing a tile in the input data of the AI unit with an AI defense module.

In one embodiment, the method may comprise receiving an aggregation indication, wherein the aggregation indication may indicate a/the at least one key figure for the at least one tile, wherein the at least one key figure may indicate a singular value decomposition, a convolution, a mean value, a median, and/or a variance for the at least one tile, respectively.

In one embodiment, determining the aggregated data may comprise subtracting a mathematical ratio(s) from the at least one tile.

In one embodiment, the method may comprise:
Receiving a target definition, in particular a user-defined one;
Determining the inference configuration by taking into account the target definition.

In one embodiment, the method may comprise receiving an aggregation indication, in particular a user-defined aggregation indication, wherein the at least one key figure and/or the aggregation indication may respectively indicate a singular value decomposition, a convolution, a mean value, a median and/or a variance for the at least one tile, wherein determining the aggregated data may be performed by taking into account the aggregation indication.

In one embodiment, determining the aggregated data may comprise subtracting an/the aggregation data from the at least one tile.

In one embodiment, the method may comprise receiving a target definition, in particular a user-defined target definition, wherein determining the inference configuration may be performed in consideration of the target definition.

Further, the method may comprise selecting in consideration of the inference configuration, in particular whether to perform a determination of whether an attack on the AI unit can be associated with the input data set and/or whether to perform a determination using the data transformation of a second input data set that cannot be associated with an attack on the AI unit.

In one embodiment, the method may comprise receiving a distribution indication, in particular a user-defined distribution indication, indicating an explicit or an implicit distribution function. In this case, the determination of the distribution function may be performed by taking into account the distribution information.

In one embodiment, the method may comprise receiving at least one threshold value, in particular a user-defined threshold value, wherein the at least one threshold value may indicate that a data transformation is performed by the AI defense module when the at least one threshold value is exceeded.

In one embodiment, the method may comprise receiving a reconstruction indication, in particular a user-defined reconstruction indication, wherein the reconstruction indication may indicate whether a data transformation concerns the entire model data, a random subset of the model data, and/or an importance-based selection of the model data. In this regard, determining the inference configuration may be performed in consideration of the reconstruction indication.

In one embodiment, a/the data transformation may be formed as a sampling method.

The object is further solved in particular by a method for preventing an attack on an AI unit, comprising the following steps of:
generating at least one AI defense module, in particular according to a method as described above, in particular using a defense generator as described above;
determining, by using the at least one AI defense module, whether an input data set of the AI unit can be associated with an attack on the AI unit; and/or
determining, by using the at least one AI defense module, a second input data set with which no attack on the AI unit can be associated and using the second input data set in a regression and/or classification.

In one embodiment, the method may comprise:
receiving a target definition, especially a user-defined one;
determining the inference configuration by taking into account the target definition;
selecting, by taking into account the target definition, whether or not
a determination of whether an attack on the AI unit can be associated with the input data set; and/or
a determination, by using the data transformation, of a second input data set with which no attack on the AI unit can be associated, is carried out.

The object is further solved in particular by a computer-readable storage medium containing instructions that cause at least one processor to implement a method as described above when the instructions are executed by the at least one processor.

Similar or identical advantages are obtained as have already been described in connection with the above-described method, the above-described defense generator and with the above-described system.

It is expressly pointed out at this point that all method steps which have been described in connection with the system are also disclosed as essential to the invention with respect to the method and the computer-readable storage medium (and vice versa). In particular, details described with respect to the defense generator and/or the system are also applicable to the method and the computer-readable storage medium, and vice versa.

Further embodiments are apparent from the subclaims.

DESCRIPTION OF DRAWINGS

In the following, the invention is explained in more detail by means of exemplary embodiments, wherein.

DETAILED DESCRIPTION

Figure 1:
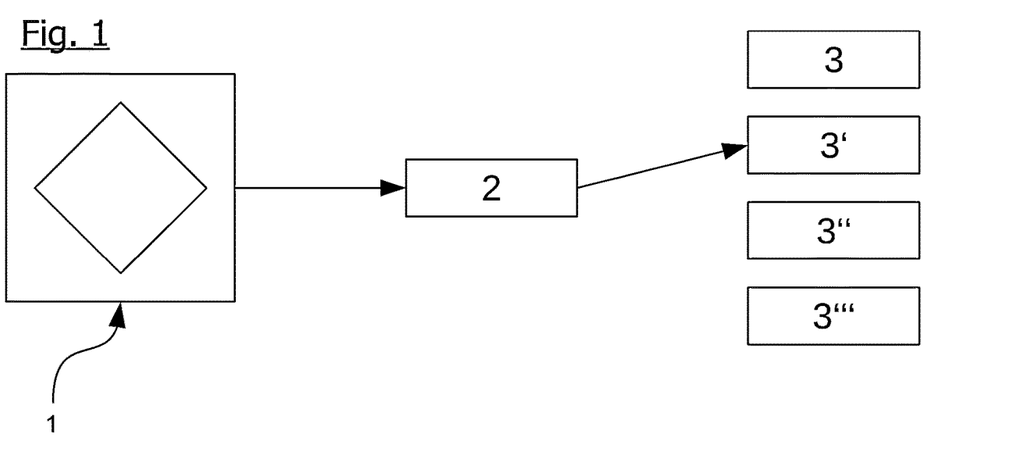
FIG. 1: shows a principle representation of the classification of an example image.

FIG. 1 shows a principle representation of the classification of an input image 1. In the exemplary embodiment of FIG. 1, the input image 1 shows a schematic representation of a stop sign. The input image 1 may therefore have been captured, for example, by a camera system of a vehicle. For example, in the case of highly autonomous driving.

To enable highly autonomous driving, it is necessary to classify the individual image components of the input image 1. This means that each pixel must be assigned whether the pixel belongs to a specific object or to which object, or whether the pixel shows the background, for example the sky.

In the shown exemplary embodiment, simplified four classes 3, 3', 3", 3''' are possible for each pixel of the input image 1. A classification unit 2 is provided for classifying the pixels, which can be designed, for example, as an artificial neural network. However, it is also conceivable that the classification unit 2 is designed as a support vector machine or as a Bayesian network.

Classification unit 2 is trained in a training phase for a specific classification task. When training a classification unit 2, a cost function is minimized using a training data set. The training data set comprises example images and corresponding associated classifications. The training dataset thus provides the so-called ground truth.

Normally, a classification unit 2 can perform image segmentation or classification of individual pixels with appropriate reliability.

Figure 2:
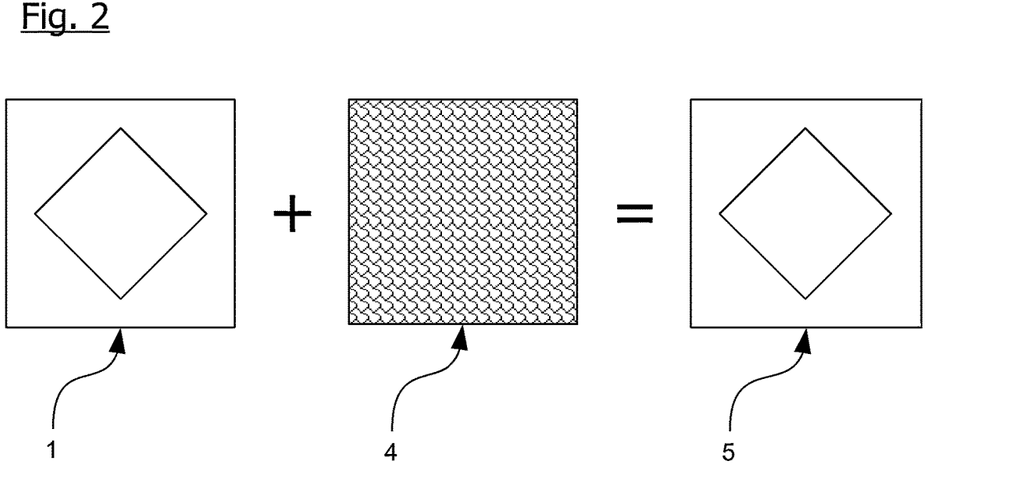
FIG. 2: shows a principle representation of the superimpositions of the example image with an adversarial interference.

FIG. 2 illustrates the case of an adversarial interference. An input image 1 is superimposed with an attack image 4. The result of the superimposition is a disturbed input image 5. The disturbed input image 5 is indistinguishable from the input image 1 for the human observer.

Figure 3:
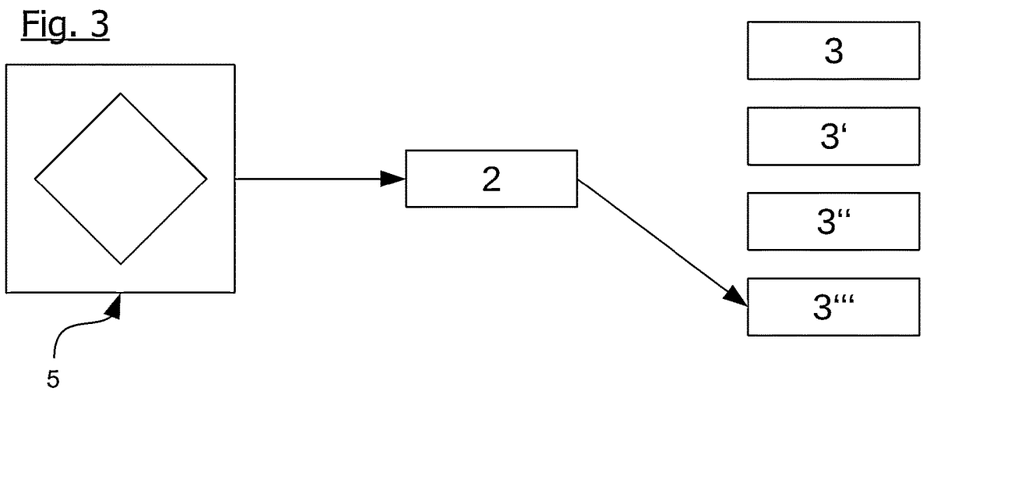
FIG. 3: shows a principle representation of the classification of the example image with an adversarial interference.

FIG. 3 illustrates the behavior of the classification unit 2 when the disturbed input image 5 is to be classified. Thus, the classification unit 2 will not assign the disturbed input image 5 to class 3' as in the case of FIG. 1, but to class 3". Thus it comes to a wrong classification.

It is thus possible to specifically interfere with classification units 2 without a human user being able to recognize the reason for this in the data. There is therefore a risk that attacks on the classification units 2 used in the vehicle will be carried out during highly autonomous driving, so that an accident may occur.

However, similar problems arise in all fields of artificial intelligence, e.g., text recognition, audio recognition, or speech recognition.

Figure 4:
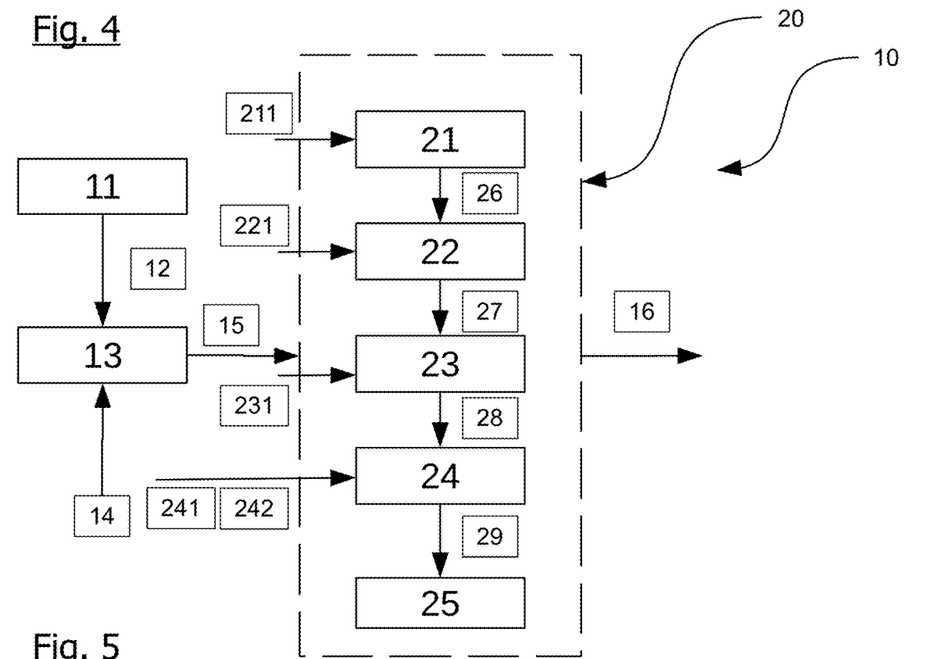
FIG. 4: shows a schematic representation of the AI defense system.

FIG. 4 shows a defense system 10 that includes a target definition unit 11, an input data unit 13, and a defense generator 20.

The target definition unit 11 is adapted to receive user input, for example through a graphical user interface or via a communication interface, indicating the target of the defense system 20 to be reached.

The user input can indicate that a detection of an adversarial attack is to be performed. This means that only it is to be determined whether input data 14 have adversarial interference.

Another way of defining the goal is that the adversarial interference should be eliminated.

In the exemplary embodiment of FIG. 4, the target definition unit 11 determines a target definition 12 by taking into account the user input, which specifies whether a detection or a filtering or reconstruction is to be performed.

The target definition 12 is supplied to an input data unit 13, which further receives an input data set 14. In the exemplary embodiment shown, the input data set 14 comprises a plurality of image data. In one possible exemplary embodiment, the image data of the input data set 14 are preprocessed to have an identical size. In another exemplary embodiment, the image data of the input data set 14 each have different sizes. In one exemplary embodiment, the input data unit 13 is adapted to preprocess the image data as described. It is understood that the input data set 14 is not limited to image data and may comprise any possible form of data.

In general, and not related to any particular exemplary embodiment, the input data set 14 may comprise data that does not exhibit adversarial interference.

Figure 5:
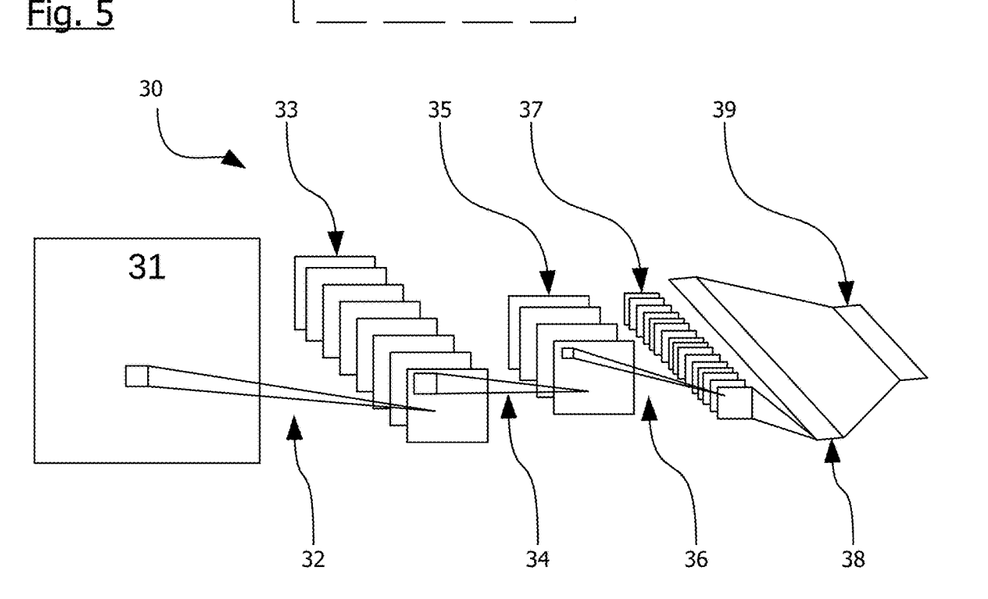
FIG. 5: shows a schematic representation of an artificial neural network.

In one exemplary embodiment, the input data set 14 comprises a plurality of feature detectors 33, 35, 37 of an artificial neural network 30 (cf. FIG. 5). In this context, a feature detector 33, 35, 37 may be formed as a matrix to which an activation function is assigned. The matrix may store the weights of the activation function. Possible activation functions are, for example, sigmoid, relu (Rectified Linear Unit) or tanh (Hyperbolic Tangent).

The input data set 14 may also be selected by a user via a graphical user interface. It is equally conceivable that the input data set 14 is received via a communication interface, for example via the Internet using an API.

In addition, the input data set 14 may have range constraints. Range constraints indicate that only portions of the remainder of input data set 14 are to be viewed. For example, the input data set 14 may indicate that only a lower portion of an image is to be viewed. This is particularly useful if important features are expected to be found only in certain areas of the image. Thus, the user has the ability to store prior knowledge about the input data set 14 in the input data set 14 itself.

The input data unit 13 determines model data 15 using the target definition 12 and the input data set 14. The model data 15 are received by the defense generator 20. The defense generator 20 has a tiling unit 21, an aggregation unit 22, a distribution unit 23, an inference unit 24, and a data transformation unit 25.

The tiling unit 21 is configured to divide the model data 15 into at least one tile 26 and to thus determine a set of tiles 53. As explained above, by dividing the model data 15 into individual tiles 26, 53, local dependencies can be exploited. To create the at least one tile 26 or tile set 53, the model data 15 may be scanned. For example, the input data set 14 and/or the model data 15 may be stored as a multi-dimensional tensor.

The tiling unit 21 may be adapted to scan the model data 15. This means that the model data 15 is sequentially divided into tiles 26. For this purpose, the tiling unit 21 may be adapted to receive a tiling indication 211. The tiling indication 211 may indicate a kernel definition indicating the size of the tiles 26. In addition to the kernel definition, the tile indication may indicate a stride and an offset. The stride specifies how many data elements, for example pixels, of the model data 15 are crossed between each scan step. The offset ensures, as described in detail earlier, that the size of the tiles and the step size do not cause the kernel to extend beyond the end of the data during scanning.

The at least one tile 26 is subsequently received by the aggregation unit 22. The aggregation unit 22 is basically adapted to determine aggregated data 27 mapping the at least one tile 26 to a finite dimensional vector space containing real numbers.

The aggregation unit 22 is adapted to receive an aggregation indication 221 indicating how the at least one tile 26 is to be processed to determine the aggregated data 27. In this regard, the aggregation unit 22 may perform various operations to determine the aggregated data 27. In the exemplary embodiment shown, the aggregation indication 221 indicates that the identity of the at least one tile 26 is to be used to determine the aggregated data 27. This means that the values of the model data 15 itself are used as the aggregated data 27.

The aggregation unit 22 passes the aggregated data 27 to the distribution unit 23. The distribution unit 23 is adapted to determine a distribution function 28 (see also FIG. 8) from the aggregated data 27. The distribution function 28 indicates the distribution of different features of the input data set 14 or the model data 15. The distribution unit 23 is adapted to receive a distribution indication 231. The distribution indication 231 indicates whether the distribution function 28 is to be determined implicitly or explicitly.

Explicit means that a certain distribution function exists which can be used to calculate the distribution function 28. Implicit means that the distribution function 28 can only be determined indirectly, for example via a L2 distance between input data and the model data 15.

Subsequently, the inference unit 24 receives the distribution function 28 and is adapted to determine an inference configuration 29. Additionally, the inference unit receives at least one threshold value 241 and a reconstruction indication 242. The at least one threshold value 241 indicates whether a detection or a reconstruction is to be performed when a comparison is made. The reconstruction indication 242 indicates whether a data transformation to be performed involves the entire model data 15, a random subset of the model data 15, and/or an importance-based selection of the model data 15.

The inference unit 24 is configured to determine an inference configuration 29, i.e., how an AI defense module 16 operates or is configured, to either determine whether adversarial interferences are present in the model data 15 or in the input data set 14, or to determine a second input data set 14 that does not include adversarial interferences.

The inference configuration 29 is received by the data transformation unit 25, which generates at least one AI defense module 16 using the inference configuration 29. The at least one AI defense module 16 may subsequently be used to detect adversarial interferences in input data or to determine a second input data set without adversarial interferences.

The at least one AI defense module 16 may thus be used, for example, as an add-on to an AI unit 30, such that prior to any classification or regression, a check is made to determine whether an adversarial interference is present in the input data to the AI unit.

The AI defense unit 16 processes input data of an AI unit according to the results of the defense generator 20. This means that the AI defense unit 16 is adapted to divide input data into at least one tile according to the tile indication 211. Further, the AI defense unit 16 is adapted to determine aggregated data corresponding to the aggregation indication 221 for the at least one tile, and then determine a distribution function using the aggregated data and the distribution indication 231.

For example, the AI defense unit 16 checks the extent to which the distribution function of the input data deviates from the distribution function 28 determined by the distribution unit 23. The AI defense unit 16 is further adapted to compare the determined deviation with the threshold value 241. Based on the comparison, it may be determined whether the input data set of the AI unit 30 has an adversarial interference.

It is understood that with the defense generator 20 it is possible to generate a plurality of AI defense modules 16 with different configurations so that a large number of adversarial interferences can be detected or eliminated. In this regard, multiple AI defense modules can process input data from an AI unit 30 in parallel so that efficient execution is enabled.

Further, the AI defense unit 16 is adapted to determine, for input data using the distribution function 28 and a data transformation, a second input data set corresponding to the input data without adversarial interferences. Sampling-based reconstruction methods may be used here, for example.

FIG. 5 describes the structure of an artificial neural network 30, which is designed as a convolutional neural network (CNN) and represents a possible AI unit 30. In an input layer 31, the data to be processed is read in. For example, the RGB values of a pixel of an image. In a first convolution 32, a scanning of a kernel over the input data layer 31 is performed to create first feature detectors 33. The feature detectors 33 may each be configured to detect specific data patterns, such as edges or corners in an image.

It is possible to use the feature detectors, or the weights and neurons of a feature detector 33, as model data 15 for the defense system 10 or the defense generator 20.

In a second convolution 34, a reduction of the feature detectors is performed by so-called pooling or subsampling, so that second feature detectors 35 are generated. In a further step, third feature detectors 37 are generated in a further convolution 36. The last layer 38 of the CNN is fully connected (fully connected layer). In the output layer 39 or soft max layer, each value is assigned a probability of belonging to a class.

Figure 6:
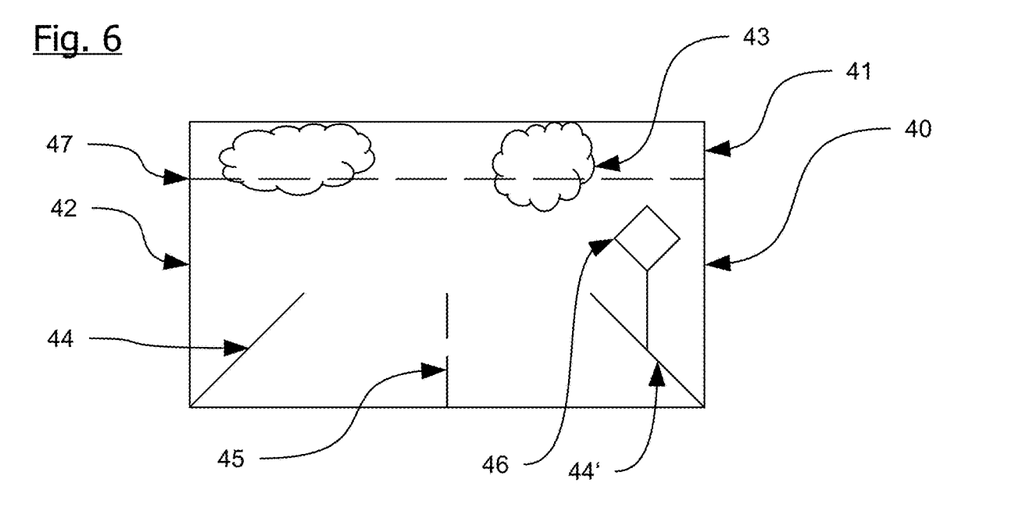
FIG. 6: shows a schematic representation of the subdivision of an input image.

FIG. 6 shows another way to improve the operation of the defense system 20. FIG. 6 shows an input image 40, which may be part of the input data 14. The input image 40 shows a stop sign 46, lane markings 44, 44', a centerline 45, and clouds 43. In autonomous driving applications, it is now possible to take more advantage of the fact that information relevant to the autonomous driving task is only found in certain areas of the image.

In the exemplary embodiment shown in FIG. 40, all relevant information is arranged in a lower image section 42. Above a dividing line 47, i.e. in the upper image section 41, there is no information relevant for driving a vehicle.

This division can be exploited in such a way that in the input data unit 13 the input data 14 are preprocessed in such a way that irrelevant image sections are deleted, i.e. the upper image section.

FIG. 7 again illustrates by way of example the division of an input image 50 or the model data 15 into a plurality of tiles 52, 52', 52", 52'".

Figure 7:
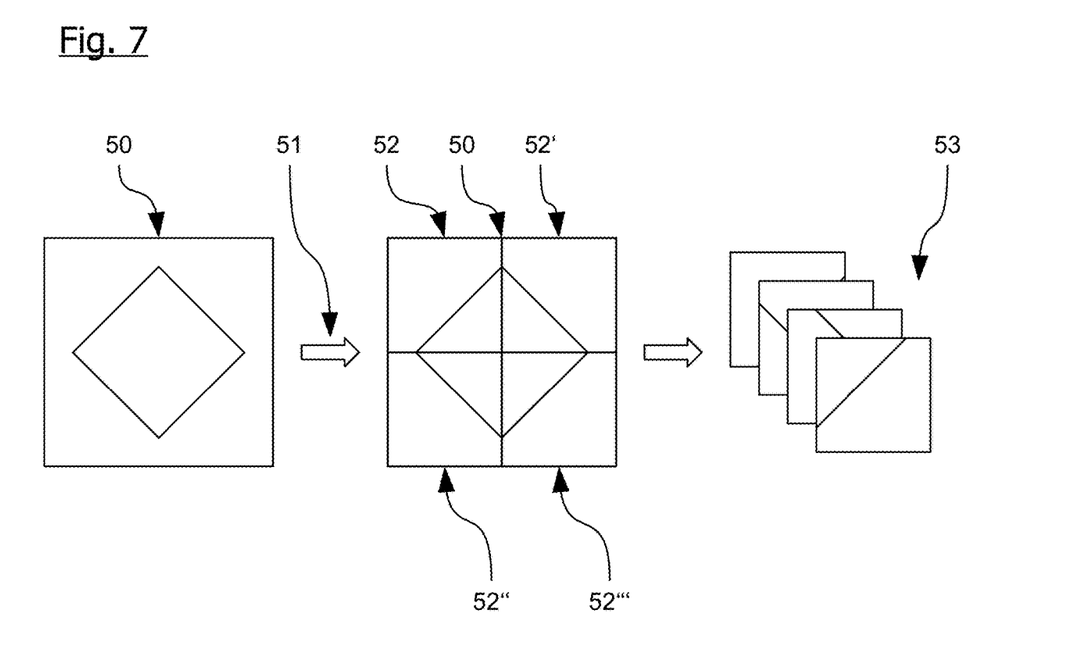
FIG. 7: shows a schematic representation of dividing an input image into different tiles.

FIG. 7 shows that an input image 50 or model data 15 is divided into four tiles 52, 52', 52", 52'" using a tile indication 51. When the input image 50 is scanned, it is scanned from the upper left to the lower right in rows. That means: first the tile 52 is created. Then, tile 52' is created, then tile 52" is created, and finally tile 52'" is created. Thus, the at least one tile 26 or the set of tiles 53 can be created in an efficient manner.

Figure 8:
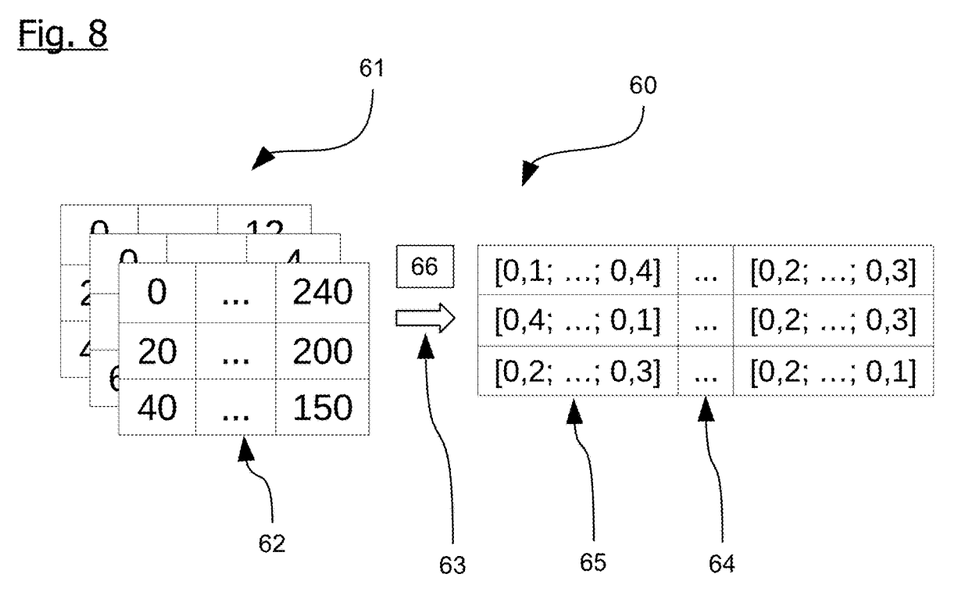
FIG. 8: shows a schematic representation of the determination of a probability distribution for a plurality of tiles.

FIG. 8 illustrates the determination 60 of the distribution function 28, 65. FIG. 8 shows a tile set 61, wherein in each data field of a tile of the tile set 61 a brightness value 62 is stored, which is an integer in the range of 0 to 255. Using the tile set 61 and a distribution indication 66, a distribution function 63 can now be determined to determine a distribution 65.

In the exemplary embodiment shown, using the set of tiles 61, the transition probability is determined that a value in the data field to the right of the current data field assumes a certain brightness value. This value is also called the overall probability value. This means that 256 values are stored in each data field of the distribution 65. The distribution 65 thus specifies a probability distribution.

Using the distribution 65, it can now be determined for input data 5 whether it contains an adversarial interference. It can be checked whether the transition probabilities of the distribution 65 explain the input data 5. In this case, a threshold value can be set that can indicate a minimum probability that the values of the input data are explained by the tile set 61. If the probability is above the threshold, there is no adversarial interference. If the probability is below the threshold, an adversarial interference is present.

It should be noted that all of the parts described above are claimed to be essential to the invention, but not indispensable, when considered alone and in any combination, especially the details shown in the drawings.

LIST OF REFERENCE SIGNS

1 Input image
2 Classification unit
3, 3', 3", 3'" Image class
4 Attack image
5 Test data set/disturbed input image
10 Defense system
11 Target definition unit
12 Target definition
13 Input data unit
14 Input data set
15 Model data
16 AI defense module
20 Defense generator
21 Tiling unit
22 Aggregation unit
221 Aggregation indication
23 Distribution unit
231 Distribution indication
24 Inference unit
241 Threshold value
242 Reconstruction indication
25 Data transformation unit
26, 53, 61 Tile/tile set
27 Aggregated data
28 Distribution function
29 Inference configuration
30 AI unit/Convolutional neural network (CNN).
31 Input layer
32 First convolution
33 First feature detectors
34 Second convolution
35 Second feature detectors
36 Third convolution
37 Third feature detectors
38 Soft Max layer
39 Output layer
40 Input image
41 Upper/First image section
42 Lower/Second image section
43 Cloud
44, 44' Lane marking
45 Centerline
46 Street sign
47 Dividing line
50 Input image
51, 211 Tile indication
52, 52', 52", 52'" Image tile
60 Distribution calculation
62 Brightness value
63 Distribution function
64 Transition matrix
65 Probability distribution
66 Distribution selection

The invention claimed is:

1. A defense generator for dynamically generating at least one AI defense module, comprising:
at least one processor;
a tiling unit, implemented by the at least one processor, which is adapted to determine at least one tile for model data, wherein the model data is associated with an AI unit and the at least one tile indicates at least one subset of the model data;
an aggregation unit, implemented by the at least one processor, which is adapted to determine aggregated data, wherein the aggregated data assign at least one mathematical key figure to the at least one tile;
a distribution unit, implemented by the at least one processor, which is adapted to determine a distribution function for the aggregated data;
an inference unit, implemented by the at least one processor, which is adapted to determine at least one inference configuration using the distribution function;
a data transformation unit, implemented by the at least one processor, which is adapted to generate at least one AI defense module for the AI unit using the at least one inference configuration, wherein the at least one AI defense module is adapted, for an input data set of the AI unit, to:
  determine whether an attack on the AI unit can be associated with the input data set; and/or
  determine, using a data transformation, a second input data set with which no attack on the AI unit can be associated;
wherein the defense generator is adapted to receive a user-definable target definition,
wherein the inference unit is adapted to determine the inference configuration by taking into account the target definition, and
wherein the data transformation unit is adapted to select, by taking into account the inference configuration, whether or not: a determination of whether the input data set can be associated with an attack on the AI unit, and/or a determination, by using the data transformation, of a second input data set with which no attack on the AI unit can be associated, is carried out.

2. The defense generator according to claim 1, wherein the tiling unit is adapted to receive a tile indication, wherein the tile indication is user-definable, wherein the tile indication preferably indicates a kernel size, a stride and/or an offset, and wherein the tiling unit is adapted to determine the at least one tile using the tile indication.

3. The defense generator according to claim 1, wherein the aggregation unit is adapted to receive a user-definable, aggregation indication, wherein the aggregation indication and/or the at least one key figure indicates in each case a singular value decomposition, a convolution, a mean value, a median and/or a variance for the at least one tile, and wherein the aggregation unit is adapted to determine the aggregated data taking into account the aggregation indication.

4. The defense generator according to claim 2, wherein the aggregation unit is adapted to receive the tile indication from the tiling unit, and wherein the aggregation unit for determining the aggregated data is adapted to subtract the tile indication from the at least one tile.

5. The defense generator according to claim 1, wherein the distribution unit is adapted to receive a user-definable distribution indication, wherein the distribution unit is further adapted to determine the distribution function by taking into account the distribution indication, and wherein the distribution indication indicates an explicit or implicit distribution function.

6. The defense generator according to claim 1, wherein the inference unit is adapted to receive at least one user-definable threshold value and to execute the determination of the inference configuration by taking into account the at least one threshold value, and wherein the at least one threshold value indicates that when the at least one threshold value is exceeded, a data transformation is executed by the AI defense module.

7. The defense generator according to claim 1, wherein the inference unit is adapted to receive a reconstruction indication, wherein the inference unit is adapted to determine the inference configuration by taking into account the reconstruction indication, and wherein the reconstruction indication indicates whether a data transformation concerns the entire model data, a random subset of the model data and/or an importance-based selection of the model data.

8. The defense generator according to claim 1, wherein the data transformation is formed as a sampling method.

9. The defense generator according to claim 1, being part of a defense system against an adversarial attack on an AI unit, the defense system comprising:
an input unit, implemented by the at least one processor, which is adapted to receive input data and/or an input model as model data;
the defense generator adapted to receive the model data and to generate at least one AI defense module;
an AI unit, implemented by the at least one processor, adapted to use the at least one AI defense module prior to performing a regression and/or classification in order to:
determine whether an attack on the AI unit can be associated with an input data set of the AI unit; and/or
to determine, by using a data transformation, a second input data set with which no attack on the AI unit can be associated, and to use the second input data set in the regression and/or classification.

10. A method for dynamically generating AI defense modules, the method comprising:
determining at least one tile for model data, wherein the model data is associated with an AI unit and the at least one tile indicates at least one subset of the model data;
determining aggregated data, wherein the aggregated data of the at least one tile are assigned mathematical key figures;
determining a distribution function for the aggregated data;
determining at least one inference configuration using the distribution function;
generating at least one AI defense module for the AI unit using the at least one inference configuration, wherein the at least one AI defense module is adapted to be used for an input data set of the AI unit in order to:
determine whether an attack on the AI unit can be associated with the input data set; and/or
to determine, using a data transformation, a second input data set with which no attack on the AI unit can be associated;
receiving a user-defined target definition;
determining the inference configuration by taking into account the target definition; and
selecting, by taking into account the target definition, whether or not a determination of whether an attack on the AI unit can be associated with the input data set; and/or a determination, by using the data transformation, of a second input data set with which no attack on the AI unit can be associated, is carried out.

11. A method for preventing an attack on an AI unit, the method comprising:
generating, based on the method of claim 10, the at least one AI defense module;
determining, by using the at least one AI defense module, whether an input data set of the AI unit can be associated with an attack on the AI unit; and/or
determining, by using the at least one AI defense module, a second input data set with which no attack on the AI unit can be associated and using the second input data set in a regression and/or classification.

12. A computer readable storage medium containing instructions that cause the at least one processor to implement the method according to claim 10 when the instructions are executed by the at least one processor.

* * * * *